United States Patent [19]
Johnson

[11] 3,838,812
[45] Oct. 1, 1974

[54] TEMPERATURE RESPONSIVE VALVE ASSEMBLY

[76] Inventor: Clarence S. Johnson, P.O. Box 940, Pomona, Calif. 91769

[22] Filed: May 3, 1973

[21] Appl. No.: 356,966

Related U.S. Application Data

[62] Division of Ser. No. 150,080, June 4, 1971, Pat. No. 3,753,526.

[52] U.S. Cl. ................................. 236/99, 236/42
[51] Int. Cl. ............................................ G05d 23/12
[58] Field of Search .......... 236/56, 58, 99, 101, 42; 251/281, 282, 331

[56] References Cited
UNITED STATES PATENTS

| | | | |
|---|---|---|---|
| 1,792,891 | 2/1931 | Clifford | 236/99 |
| 2,924,387 | 2/1960 | Hajny | 236/99 A |
| 3,121,315 | 2/1964 | Matthies | 251/11 |
| 3,489,349 | 1/1970 | Hilmer et al. | 236/58 |
| 3,593,917 | 7/1971 | Buisson | 236/99 |

Primary Examiner—William E. Wayner
Assistant Examiner—W. E. Tapolcai, Jr.
Attorney, Agent, or Firm—Brady, O'Boyle & Gates

[57] ABSTRACT

A temperature responsive valve assembly having a fixed disc secured to the valve body; a yoke member is slidably mounted on the disc and a compression spring is positioned on one side of the disc and biases the yoke against a diaphragm type valve urging the diaphragm to closed position. A temperature responsive bellows is mounted on the opposite side of the disc and, when expanded, moves the yoke and associated diaphragm to an open position. A counter-diaphragm is interconnected with the diaphragm valve and is adapted to move in unison therewith to thereby provide a pressure-equalizing function within the valve body during operation.

2 Claims, 3 Drawing Figures

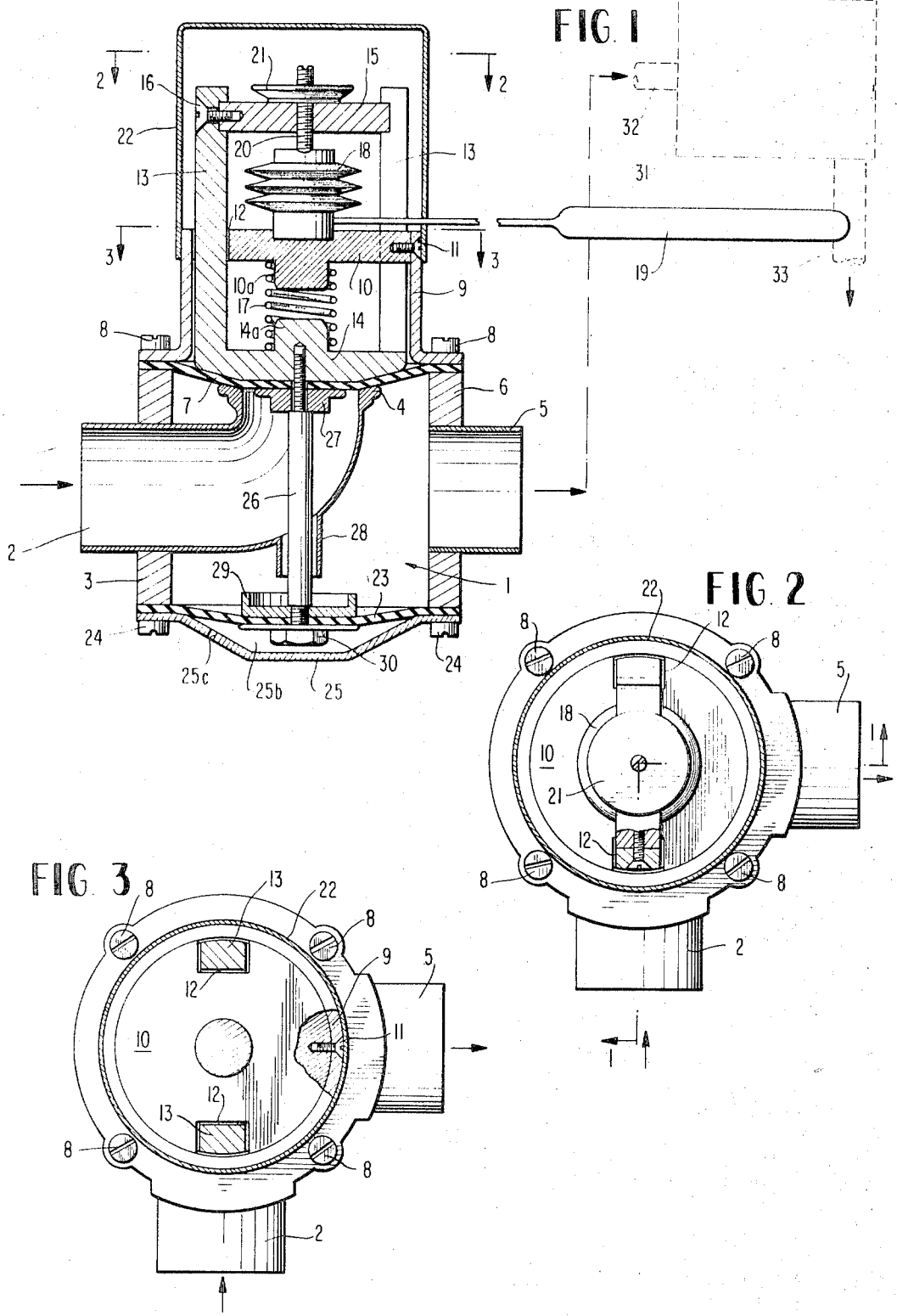

TEMPERATURE RESPONSIVE VALVE ASSEMBLY

This is a division, of application Ser. No. 150,080, filed June 4, 1971, now U.S. Pat. No. 3,753,526.

BACKGROUND OF THE INVENTION

Heretofore various types of thermal responsive valves have been proposed wherein temperature responsive bellows oppose the force of a spring, biasing the valve to a closed position, whereby the valve is moved to open position in response to the expansion of the bellows. While these thermal valves have been satisfactory for their intended function, they have been subject to certain objections; such as, their complicated design and the slow valve actuation in response to temperature variations. In many of these designs, the opening of the valve is caused indirectly by the bellows; that is, the expansion of the bellows decreases the closing biasing force of the spring whereby the pressure of the fluid being controlled forces the valve to an open position. Such an arrangement results in a slow responsive valve assembly which is very difficult to adjust in order that it might perform its function within an effective temperature range of a few degrees.

To overcome the objections experienced in the heretofore employed temperature responsive valves, the valve assembly of the present invention has been devised wherein the temperature responsive bellows for opening the valve and the compression spring for closing the valve are each connected to the valve and are constructed and arranged whereby the bellows acts directly on the valve to move it to open position, whereby the valve assembly may be adjusted for actuation within an effective temperature range of a few degrees.

IN THE DRAWINGS

FIG. 1 is a sectional, side elevational view of the valve assembly of the present invention, shown schematically connected to a heat exchanger;

FIG. 2 is a view taken along line 2—2 of FIG. 1; and

FIG. 3 is a view taken along line 3—3 of FIG. 1.

Referring to the drawings, and more particularly to FIG. 1, the temperature responsive valve assembly of the present invention comprises a cylindrically shaped main body portion 1 having an inlet fitting 2 secured to an end wall 3 of the main body portion, the inlet fitting extending within the main body portion and being turned upwardly and terminating in a valve seat 4. An outlet fitting 5 is secured to an end wall 6 of the main body portion, and while the outlet fitting is shown (FIG. 2) disposed 90° from the inlet fitting 2, the inlet and outlet fittings could be aligned, depending upon the installation within which the valve assembly is to be employed.

The top edge of the main body portion is sealed by a flexible diaphragm 7 adapted to engage the valve seat 4 whereby the valve assembly is in closed position, to be described more fully hereinafter. The diaphragm 7 is secured to the main body portion by suitable bolts 8 extending through a flange portion formed on the lower end of a vertically extending cylindrical housing 9, the upper end portion of which is closed by a wall or disc 10 secured to the housing by screws 11. The disc 10 is provided with a pair of diametrically opposed slots 12 which slidably receive a pair of vertically extending legs 13 of a yoke assembly which includes a base portion 14 extending between and integrally connected to the lower portions of the legs, and an arm 15 extending between and connected to the upper end portions of the legs by screws 16.

A coil spring 17 is disposed between the lower surface of the disc 10 and the yoke base 14 for biasing the diaphragm 7 against the valve seat 4, the disc and base being formed with protuberances 10a and 14a, respectively, to provide seats for the coil spring and to limit the upward movement of the yoke assembly. An expansible bellows 18 communicating with a temperature sensing bulb 19 is disposed between the upper surface of the disc 10 and an adjusting stem 20 threadably mounted within the arm 15, the stem being provided with a lock nut 21 for maintaining the stem in the adjusted position.

A cover 22 is provided for protecting the bellows, spring, etc. from dust and is mounted on the upper edge portion of the housing 9 with a friction fit to facilitate the removal thereof for access to the thermostatic controls.

The bottom edge of the main body portion is sealed by a diaphragm 23, identical to the upper diaphragm 7, and secured to the main body portion by bolts 24 extending through a flange portion on the periphery of a dished cover plate 25, thus forming, with the diaphragm, a chamber 25b communicating with the atmosphere through aperture 25c. A vertically extending rod 26 is connected between the upper and lower diaphragms, the upper end portion of the rod extending through a washer 27 and being threaded within the yoke base 14, the opposite end of the rod extending through an orifice 28, formed in the inlet fitting 2, the end of the rod being secured to the lower diaphragm 23 by cup 29 and washer-nut assembly 30. The orifice 28 not only allows the rod 26 to extend between the diaphragms but it also provides a minimum-flow-orifice sized to permit direct flow-through of a predetermined volume of fluid per minute.

In the operation of the valve assembly of the present invention, assuming that the valve assembly is employed for controlling the flow of water to a heat exchanger 31, shown schematically in FIG. 1, the valve outlet is connected to the heat exchanger inlet 32 and the temperature sensing bulb is positioned within the heat exchanger outlet 33. The relatively cool water flowing through the valve inlet 2, orifice 28 and outlet 5 is heated to a predetermined temperature in the heat exchanger 31, the predetermined temperature range being sensed by the bulb 19 at the heat exchanger outlet. While the temperature of the heated water is maintained within the predetermined range, the diaphragm 7 will be biased to the closed position by spring 17 as shown in FIG. 1. If the temperature of the water exhausting from the heat exchanger outlet increases beyond a predetermined degree, this increase is sensed by the bulb 19 causing the bellows 18 to expand. The expansion of the bellows 18 causes the yoke assembly to move upwardly to thereby lift the diaphragm 7 off the seat 4 whereby a greater volume of relatively cool water is allowed to flow through the valve assembly and into the heat exchanger until the predetermined temperature is once again obtained at the heat exchanger outlet, whereupon the bellows contract to allow the spring 17 to bias the diaphragm against the seat 4.

From the above description, it will thus be seen that the construction and arrangement of the spring 17, bellows 18 and yoke assembly results in a temperature responsive valve assembly wherein the bellows is directly connected to the valve assembly for positively moving the valve to the open position and the spring is also directly connected to the valve assembly for positively moving the valve to the closed position. When the valve assembly is moved to open position, the pressure of fluid acts against the diaphragms; however, since the diaphragms are identical and opposite each other, the force of the fluid is effectively equalized, whereby the only closing force acting against the bellows 18 will be the coil spring 17.

It is to be understood that the form of the invention herewith shown and described is to be taken as a preferred example of the same, and that various changes in the shape, size and arrangement of parts may be resorted to, without departing from the spirit of the invention or scope of the subjoined claims.

I claim:

1. A temperature responsive valve assembly comprising a main body portion, an inlet and an outlet connected to said main body portion, a valve seat mounted within said main body portion between said inlet and said outlet, housing means connected to said main body portion, one end of said housing means being open and communicating with the interior of the main body portion, wall means connected to the opposite end of the housing means, valve means mounted within said housing means and extending through the open end of the housing means into said main body portion, spring means positioned in said housing means on one side of said wall means, one end of said spring means engaging said wall means and the opposite end of said spring means engaging said valve means for biasing the valve means to closed position against said valve seat, said valve means sealing said spring means from fluid flowing through said main body portion, temperature responsive means positioned in said housing means on the opposite side of said wall means, said temperature responsive means engaging said wall means and said valve means for moving the valve means to open position away from the valve seat, and an orifice formed in said inlet upstream from said valve seat, said orifice being sized to provide a minimum-flow orifice to permit the through flow of a predetermined volume of fluid per minute when the valve assembly is in the closed position.

2. A temperature responsive valve assembly comprising a main body portion, an inlet and an outlet connected to said main body portion, a valve seat mounted within said main body portion between said inlet and said outlet, housing means connected to said main body portion, said housing including end wall means, valve means mounted within said housing means, said valve means comprising a flexible diaphragm secured to the main body portion and a yoke assembly slidably mounted within said housing means, said yoke assembly including a base portion engaging said diaphragm, spring means biased between said wall means and said base portion for urging the diaphragm against said valve seat, a pair of legs connected to said base portion and extending through said wall means, an arm extending between said legs, temperature responsive means engaging said wall means and said arm for moving the valve means to open position away from the valve seat, an orifice formed in said inlet upstream from said valve seat, said orifice being sized to provide a minimum-flow orifice to permit the through flow of a predetermined volume of fluid per minute when the valve assembly is in the closed position, a second diaphragm secured to said main body portion between said minimum-flow orifice and the valve outlet, and a rod extending through said orifice, one end of said rod being connected to the first-mentioned diaphragm and the opposite end of said rod being connected to the second mentioned diaphragm.

* * * * *